Nov. 1, 1949.  W. H. SILVER  2,486,442
TRASH CLEARER FOR PLOWS HAVING A ROLLING COLTER
Filed April 6, 1945
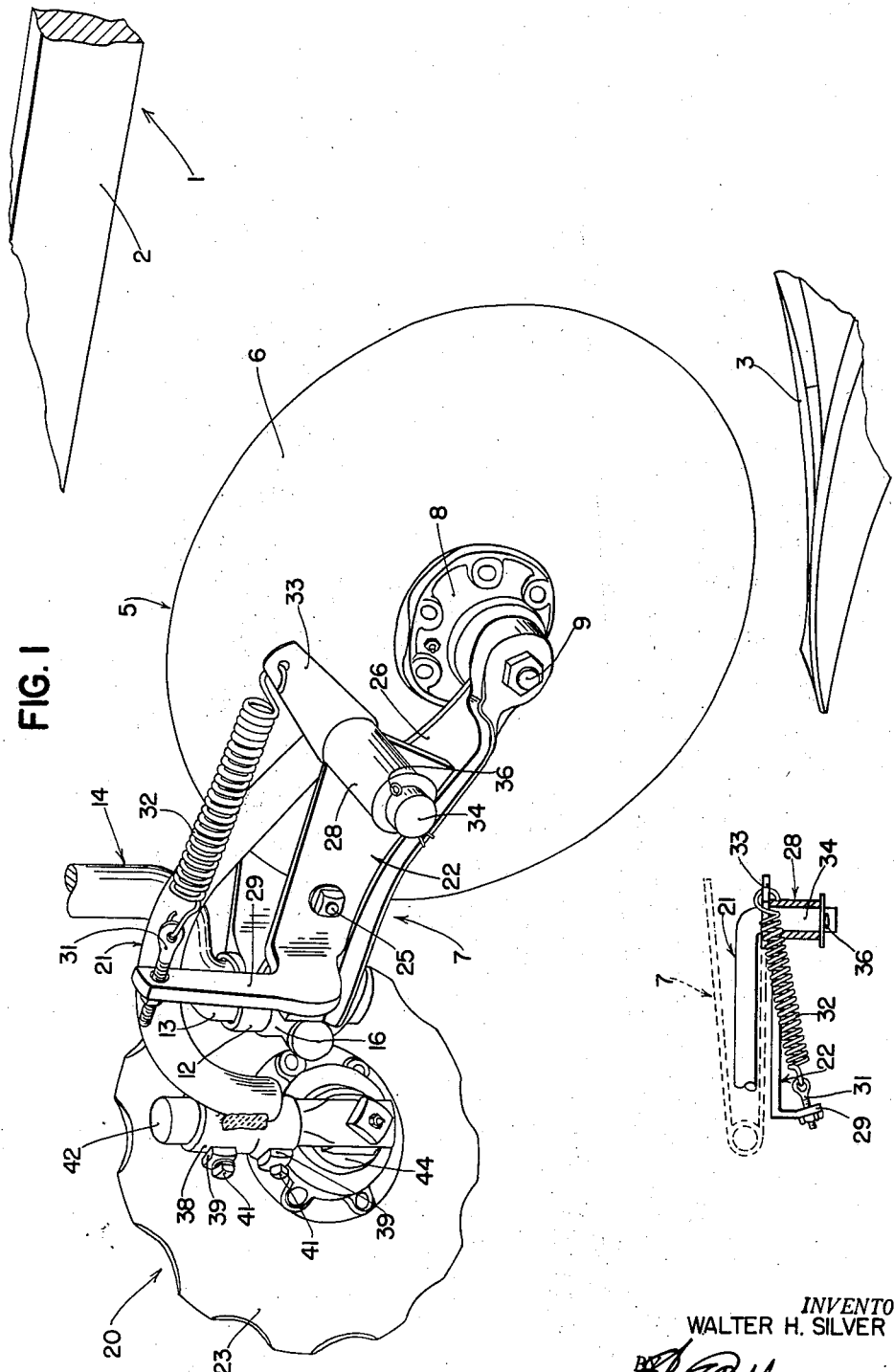
INVENTOR.
WALTER H. SILVER
ATTORNEYS
WITNESS Patented Nov. 1, 1949

2,486,442

UNITED STATES PATENT OFFICE 2,486,442

TRASH CLEARER FOR PLOWS HAVING A ROLLING COLTER

Walter H. Silver, Moline, Ill., assignor to Deere & Company, Moline, Ill., a corporation of Illinois Application April 6, 1945, Serial No. 586,955

13 Claims. (Cl. 97—194)

1

The present invention relates generally to farm equipment and is more particularly concerned with improvements in plows and the like.

The object and general nature of the present invention is the provision of an attachment for plows to clear a path for the travel of a rolling colter so as to permit the plows to be used successfully under conditions of excess trash, debris, and the like. For example, it has been found that after a grain crop has been combined considerable amounts of straw are left in the field. Difficulty is not encountered in plowing the field subsequent to such combining operations except under conditions where the combine, instead of depositing the straw evenly and uniformly, discharges the straw in fairly large masses. When attempting to plow a field under such conditions, it has been found that the conventional rolling colter, while fully adequate to operate under trashy conditions normally encountered, will fail to cut down through such lumps or masses of straw; instead, the colter, being unable to cut through the straw, pushes the same ahead, gathering more straw while the plow becomes choked and fouled, requiring the operator to stop the outfit and clear away the excess straw, debris, and the like.

Having in mind that the ordinary rolling colter can handle quite a quantity of trash, soil or the like, so long as the same is more or less evenly and uniformly distributed on the ground and not too thick, the present invention contemplates the provision of an attachment adapted to be mounted ahead of a rolling colter and so constructed and arranged to operate to push aside excessive quantities of soil, debris, and the like from the path of movement of the colter. Specifically, it is an important feature of this invention to provide a trash clearer disk set at an angle to the line of advance and mounted generally for vertical movement directly onto the colter yoke and entirely ahead of the rolling colter but fairly close adjacent to the vertical axis of movement of the colter. Being set at an angle, the disk rotates due to the pressure of the trash against the lower portion thereof, and the rotation of the disk, together with its angular positioning, causes the disk to push aside any excessive masses of straw and the like so that the colter is enabled to cut down through any remaining trash and into the ground, thereby facilitating the separation of the furrow slice from the land.

These and other objects and advantages of the present invention will be apparent to those skilled in the art after a consideration of the following detailed description, taken in conjunction with the accompanying drawings.

In the drawings:

Figure 1 is a perspective view of my trash clearer attachment, showing the same as mounted on the colter yoke of the rolling colter of a conventional moldboard plow.

Figure 2 is a top view.

Referring now to the drawings, the plow upon which my present invention has been mounted is indicated in its entirety by the reference numeral 1 and is of conventional construction, including one or more plow beams 2 to the rear end of each of which a plow bottom 3 is attached. Secured to each plow beam is a rolling structure 5, comprising a rolling colter 6, a forked colter yoke 7, between the sides of which the colter 6 is disposed and is mounted for rotation by suitable bearing means 8 supported on the yoke 7 by a bolt, shaft or the like, as indicated at 9. The forward portion of the colter yoke is formed with a bearing section 12 extending generally vertically and receiving the lower offset end 13 of a colter shank or standard 14 which is secured to the associated plow beam by suitable clamp means. Normally, the shank or standard 14 is adjusted so that the colter 6 is disposed in a vertical longitudinal plane passing alongside the landward portion of the plow bottom 3, generally in the neighborhood of a half inch, more or less, from the landside face of the plow bottom 3. A clamping member 16 serves to hold the bearing section 12 of the colter yoke in position and limits the lateral swinging of the colter.

The trash clearer, with which the present invention is more particularly concerned, is indicated in its entirety by the reference numeral 20 and, in general, comprises a forwardly extending arm 21 pivoted at its rear end to a bracket 22 mounted on the colter yoke 7 and a notched clearer disk 23 journaled on the forward end of the arm 21. The bracket 22 is adapted to be bolted, as by a pair of bolts 25, to the landward arm 26 of the colter yoke 7, preferably using the same holes in the section 26 which conventionally receives a jointer. The bracket 22 carries a laterally extending bearing sleeve 28, preferably at the rear portion of the bracket 22, and at its forward end the latter is formed with an upstanding lug 29 that is apertured to receive an adjusting bolt 31 to the rear end of which a spring 32 is connected. The rear end of the spring 32 is hooked into an arm section 33 welded or otherwise permanently secured to the rear end of the arm 21. The latter includes a laterally extending section 34 which is received for rocking movement in the bearing sleeve 28 and is held against displacement therein by a washer and cotter key 36, and by the contact between the arm section 33 and the laterally inner end of the bearing sleeve 28.

The arm 21 extends forwardly and lies alongside the bracket 22, laterally inwardly thereof and curves downwardly at its forward end where it receives a vertical bearing sleeve 38, preferably welded thereto. A pair of nuts 39, welded to the sleeve 38, serve to receive set screws 41, and the latter when tightened secure in the sleeve 38 a vertically extending spindle member 42 to the lower end of which is fixed suitable bearing means 44 upon which the disk 23 is mounted for rotation. The member 42 may be raised or lowered within the sleeve 38 or turned to dispose the disk 23 at different angles, as desired, to the path of movement of the outfit. The rear laterally turned end 34 is a rigid part of the arm 21 and the sleeve 28 is of sufficient length to insure the arm 21 being laterally rigid. However, the arm 21 is free to swing in a generally vertical direction but is urged for downward movement by the tension in the spring 32, which may be adjusted by the adjusting bolt 31. Downward movement of the arm 21 is limited by its contact with the side 26 of the colter yoke or the adjacent portion of the bracket 22.

By virtue of the curved construction of the arm and the vertical disposition of the bearing sleeve 38 receiving the clearer disk spindle, the axis of the disk lies very close to the vertical axis of lateral swinging movement of the colter yoke. By virtue of this construction, the side thrust, due to the pressure of the trash and the like against the disk 23, has very little effect on the rolling colter 6, so far as tending to swinging it toward for furrowward side is concerned.

In operation, the clearer disk 23 is set at such an angle that, as the outfit moves forwardly, any excessive quantities of straw, trash and the like is pushed forwardly away from the path of movement of the rolling colter 6. The arm 21 is so constructed and mounted, as best shown in Figure 2, that the clearer disk 23 is mounted substantially directly ahead of the forward edge of the rolling colter 6. Normally, the disk 23 rides very lightly along the surface of the ground, and hence adds no appreciable draft to the plow. If the bolt 31 is adjusted to afford only spring pressure, the disk 23 may ride slightly above the ground, the notches in the disk assuring that it will rotate so as to place the upper portion, at least, of the trash away from the path of movement of the colter. The tension in the spring 32 should be sufficient, however, to insure that any excessive quantities or accumulated masses of trash or the like will be effectively pushed aside, permitting only that amount of straw, trash or the like to pass under the disk 23 which can readily and efficiently be handled by the rolling colter 6.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A trash clearer for plows having a rolling colter, said trash clearer comprising a support carried by the plow and including a part mounted substantially directly ahead of said colter, and a rotatable disk disposed for rotation on said support substantially in contact with the ground directly ahead of said colter and arranged at an angle whereby the forward travel of the plow will cause the disk to rotate and push trash and the like laterally away from the path of travel of the colter.

2. In a plow having a beam and a colter rotatably carried by said beam, the improvement which comprises a trash clearer adapted to be carried by said beam and in a position forwardly of said colter, said trash clearer comprising a rotatable part carried in a position to engage the ground and shiftable in a direction to sweep trash and the like away from the path of travel of the colter.

3. A trash clearer for plows and the like having a colter and a colter yoke supporting said colter, said trash clearer comprising an arm pivoted adjacent its rear end to said colter yoke for generally vertical movement relative thereto, said arm extending forwardly of the forwardmost portion of said colter, and a rotatable trash removing means carried for rotation at the forward portion of said arm and in a position to engage the ground and remove trash laterally from a point substantially directly in front of said colter.

4. An agricultural implement having a rolling colter and a colter yoke receiving said colter, and a trash clearer comprising an arm pivotally connected to said colter yoke and extending forwardly thereof, and a notched disk journaled for rotation on the forward end of said arm in a position substantially directly forwardly of the colter and adapted to substantially engage the ground, said notched disk being disposed so as to face forwardly and lie at an angle to the line of forward movement whereby said notched disk will be caused to rotate and shift the trash and the like laterally from the path of travel of the colter.

5. An agricultural implement having a rolling colter and a laterally swingable colter yoke receiving said colter, a trash clearer comprising an arm pivotally connected to said colter yoke and extending forwardly thereof, said arm including a disk-receiving part disposed adjacent the axis of lateral swinging of said colter yoke, and a rotatable trash clearer disk mounted for rotation on said disk-receiving portion of said arm and disposed by the latter adjacent said axis and substantially directly ahead of said colter.

6. A trash clearer adapted to be mounted on a laterally swingable colter yoke, comprising a supporting bracket adapted to be fixed to said yoke, an arm pivotally connected with said bracket for generally vertical swinging movement, the forward end of said arm extending beyond the forward portion of said yoke and adjacent the axis of lateral swinging of the latter, and a trash clearer means carried at the forward end of said arm adjacent said axis.

7. The invention set forth in claim 6, further characterized by means acting between said bracket and said clearer arm for urging said trash clearer means generally downwardly.

8. In a plow having a rolling colter to facilitate operating the plow under trashy conditions and a colter yoke receiving said colter, the improvement which comprises means for clearing excessive quantities of trash away from the path of movement of the colter, said means including a rotatable disk disposed substantially directly ahead of said colter and arranged at an angle to the direction of forward travel and to substantially engage the ground ahead of the colter, and means for supporting said disk on said colter yoke.

9. In a plow having a rolling colter to facilitate operating the plow under trashy conditions, means for clearing excessive quantities of trash away from the path of movement of the colter, comprising a rotatable disk disposed substantially directly ahead of said colter and arranged at an angle to the direction of forward travel, a disk supporting arm adapted to be pivotally connected at one end with said plow and carrying said disk at the other end, spring means connected with said arm and said disk for urging the latter generally downwardly, and stop means disposed in the path of movement of said disk-carrying arm for limiting the downward movement of the latter.

10. In a plow having a rolling colter and a laterally swingable colter yoke upon which said colter is mounted, a trash clearer comprising a bracket adapted to be fixed to one side of said colter yoke and including a laterally extending bearing member at the rear end of said bracket and a generally upwardly extending lug at the forward end of the bracket, an arm including a laterally directed section received for rocking movement in said bearing member and extending forwardly thereof generally alongside said upwardly extending lug, means carried by the forward end of said arm substantially directly in front of said colter for removing trash and the like from the path of movement of the colter, and spring means acting between said upwardly extending lug and said arm for urging said trash clearer means generally downwardly.

11. The invention set forth in claim 10, further characterized by said trash clearer comprising a disk and a vertical member upon the lower end of which said disk is mounted for rotation, and a sleeve section carried at the forward end of said arm and receiving said disk-carrying member, the latter being adjustable both vertically and rotatively therein.

12. The invention set forth in claim 10, further characterized by said arm being adapted to engage a portion of the colter yoke for limiting the downward movement of said trash clearer means in front of said colter.

13. In a plow having a rolling colter and a colter yoke upon which said colter is mounted, a trash clearer comprising a bracket adapted to be fixed to said colter yoke and including a bearing member at the rear end of said bracket and a lug at the forward end thereof, an arm mounted at its rear end for rocking movement in said bearing member and extending forwardly generally alongside said colter yoke, a trash clearing disk carried for rotation by the forward end of said arm substantially directly in front of said colter and adapted to substantially engage the arm whereby the forward travel of the plow causes said trash clearer disk to rotate and remove trash and the like from the path of movement of the colter, and spring means acting between said lug and said arm for urging said disk generally downwardly.

WALTER H. SILVER.

REFERENCES CITED

The following references are of record in the file of this patent:

UNITED STATES PATENTS

| Number | Name | Date |
|---|---|---|
| 836,544 | Upton | Nov. 20, 1906 |
| 1,260,752 | Casaday | Mar. 26, 1918 |
| 1,696,192 | Dasen | Dec. 25, 1928 |
| 2,161,714 | Lindelof | June 6, 1939 |